United States Patent

Bai et al.

[11] Patent Number: 5,925,959
[45] Date of Patent: *Jul. 20, 1999

[54] ELECTRIC GENERATOR WITH NOVEL STRUCTURE

[75] Inventors: Xiabin Bai; Xibin Zhang, both of Room 202, Bldg. 3, No 147 Jiefang Road, Shenzhen City, China, 518008; Bin Wang, Shenzhen, China; Nianguo Ye, Shenzhen, China; Hongchang Ren, Shenzhen, China

[73] Assignees: Xiabin Bai; Xibin Zhang, both of Shenzhen City, China

[*] Notice: This patent issued on a continued prosecution application filed under 37 CFR 1.53(d), and is subject to the twenty year patent term provisions of 35 U.S.C. 154(a)(2).

[21] Appl. No.: 08/836,477
[22] PCT Filed: Oct. 30, 1995
[86] PCT No.: PCT/CN95/00084
  § 371 Date: Jul. 30, 1997
  § 102(e) Date: Jul. 30, 1997
[87] PCT Pub. No.: WO96/13891
  PCT Pub. Date: Sep. 5, 1996

[30] Foreign Application Priority Data

Oct. 31, 1994 [CN] China .................. 94116889-1

[51] Int. Cl.$^6$ ..................................... H02K 1/00
[52] U.S. Cl. .................. 310/179; 310/181; 310/198; 310/206; 310/269; 310/49 R
[58] Field of Search ................. 310/179, 181, 310/269, 198, 49 R, 206; 242/703

[56] References Cited

U.S. PATENT DOCUMENTS

| | | | |
|---|---|---|---|
| 2,473,302 | 6/1949 | Ringland | 171/252 |
| 3,218,494 | 11/1965 | Bacon et al. | 310/156 |
| 4,292,559 | 9/1981 | Auinger et al. | 310/206 |
| 4,351,102 | 9/1982 | Grozinger et al. | 29/596 |
| 4,541,575 | 9/1985 | Dickerson | 242/703 |
| 4,746,827 | 5/1988 | Ochiai et al. | 310/156 |
| 5,128,570 | 7/1992 | Isozaki | 310/49 R |

FOREIGN PATENT DOCUMENTS

| | | |
|---|---|---|
| 85 1 06443 | 3/1987 | China . |
| 0 350 727 | 1/1990 | European Pat. Off. . |
| 0 454 039 | 10/1990 | European Pat. Off. . |
| 1 496 455 | 12/1977 | United Kingdom . |

OTHER PUBLICATIONS

Chen, Shikun, *Electrical Generator Design*, vol. 2, pp. 95–96 (Jun. 1982).

*Primary Examiner*—Steven L. Stephan
*Assistant Examiner*—Thanh Lam
*Attorney, Agent, or Firm*—Flehr Hohbach Test Albritton & Herbert LLP

[57] ABSTRACT

The present invention provides a electric generator with novel structure, comprising two parts: a stator and a rotor. The stator has rectangle-section winding slots. The stator teeth have sectorial section. Slits are formed extending axially in the yoke and the magnet poles laid on the yoke in the rotor. The stator windings are made up of square-wave open rings with different pitches. The generator of the present invention has much less weight and smaller size, and the manufacturing process is simple, the consuming of copper and silicon steel sheets can be reduced, the efficiency is higher and energy can be saved.

15 Claims, 3 Drawing Sheets

ELECTRIC GENERATOR WITH NOVEL STRUCTURE

TECHNICAL FIELD

The present invention relates to a multi-poles magneto electric generator having special windings, and is particularly adaptive for frequency-changeable generators.

BACKGROUND ART

The electric generators of the prior art have some deficiencies, such as low effective flux due to the large winding slots of the armature core; high internal resistance of the coil; high power consumption, resulting in temperature rising easily; long and overlapped end of the stator windings; high eddy loss of the rotor and so on, which cause the restrictions on power output, materials cost, and size of the electric generator, consequently limit its application.

DISCLOSURE OF THE PRESENT INVENTION

The object of the present invention is to provide a novel electric generator which has smaller size, higher power output and saves the materials to build it.

The present invention is an improvement to the structures of the stator and rotor of a conventional generator. The sections of the stator winding slots are rectangular shape and the sections of the teeth are sectorial shape, thereby the effective area of the armature core is increased and the total effective flux rises. The stator windings are comprised of square-wave open rings with different pitches, so that the lengths of the end windings are decreased, and a lower internal resistance can be obtained. Magnet poles are laid on the magnet yoke of the rotor, and slits extending axially along the rotor are formed in the magnet poles and the magnet yoke. By means of these slits the iron loss of the generator decreases and using efficiency increases. The number of the stator slots and teeth is a multiple of 3, and the number of the teeth is a multiple of 3 times as much as the number of the magnet poles. The distance between each two adjacent magnet poles laid on the rotor surface equals to the width of one slot on the stator. The thickness of the magnet poles laid on the rotor surface is equal to 7–8 times as much as the width of the air gap between the rotor and stator. The magnet poles are fixed to the rotor surface with adhesive. The two ends of each of the magnet poles laid on the rotor are formed into wedge shape and tightly held by wrap-edges of the rotor, and the portion held by the wrap-edges is not greater than a quarter of the pole thickness. The length of the slits extending axially in the magnet poles and the yoke of the rotor is longer than a half of the axial length of the magnet pole. The width of the slits extending axially in the magnet poles and the yoke of the rotor is 0.1 mm. Three branch windings belong to one set of windings corresponding to a pair of opposite magnet poles are arranged to embed in their respective slots on the stator with different pitches as: crossing 5 teeth then crossing 1 tooth; crossing 3 teeth then crossing 3 teeth; and crossing 1 tooth then crossing 5 teeth. Each 12 slots on the stator form a minimum unit. The windings between the units can be connected in series, parallel or series-parallel mode. A plurality of winding sets overlapped in multiple layers are embedded in the stator slots at a same position and the windings thereof can be connected in series, parallel or series-parallel mode. With their respective displacement the three-phase windings are embedded in their respective slots of the stator. The winding arranged in each layer in each slot of the stator comprises a single conducting wire.

Compared to the prior art, the present invention has the advantages such as: smaller size, simpler manufacture process, saving on materials, and higher generator efficiency etc.

PREFERRED EMBODIMENTS OF THE PRESENT INVENTION

Figure 1:
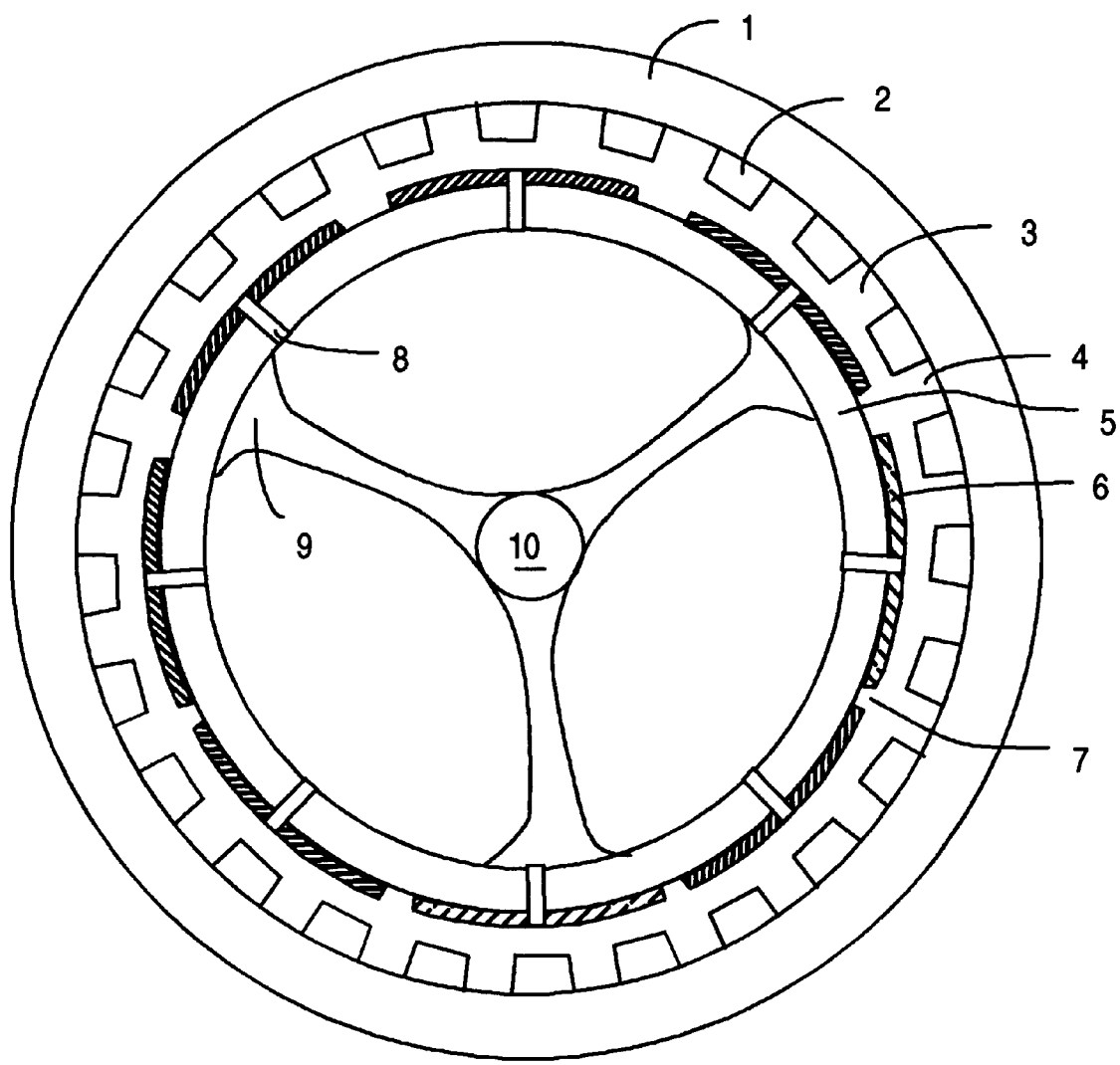
FIG. 1 is a schematic sectional view of the generator of the present invention.
Figure 2:
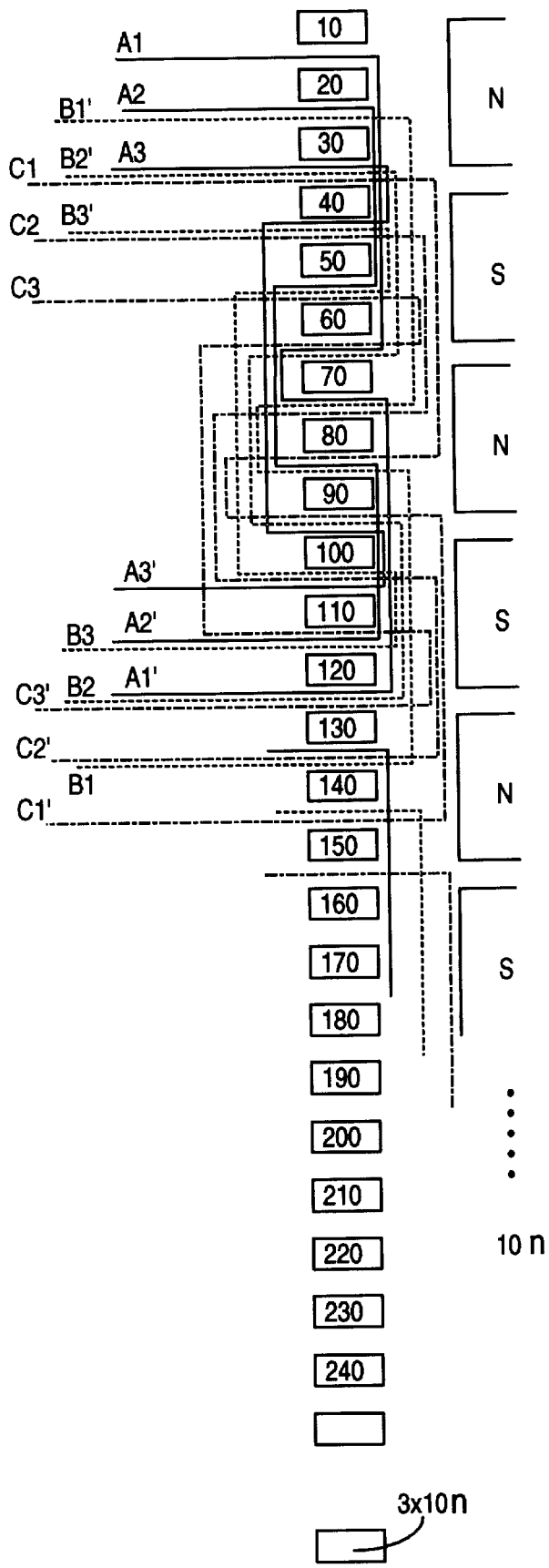
FIG. 2 is a schematic developed view of the stator windings of the present invention.
Figure 3:
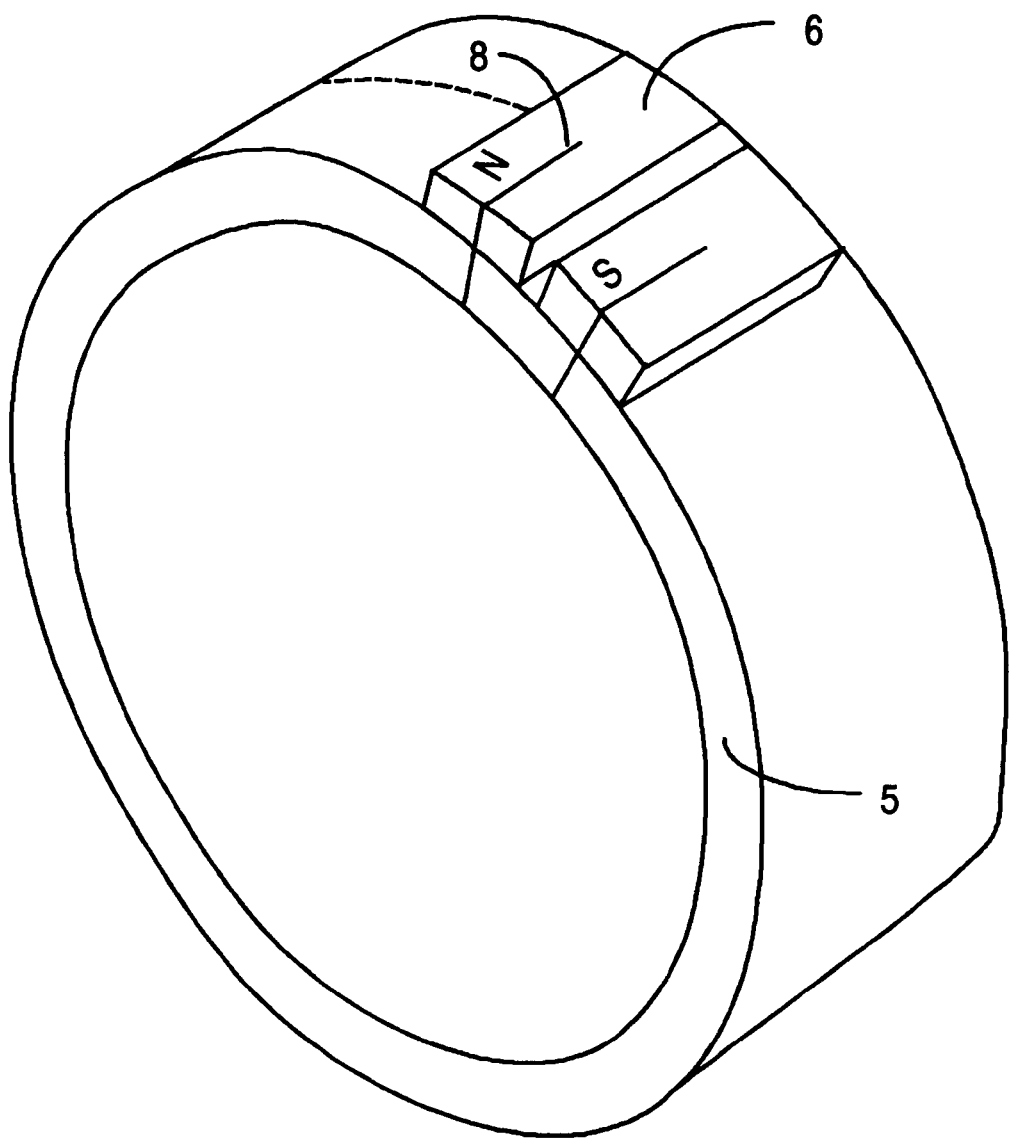
FIG. 3 is a schematic structural view of the rotor and its magnet poles of the present invention.

As shown in FIG. 1, the present invention comprises two major parts: stator 1 and rotor 5. The sections of the winding slots 3 of the stator are rectangular and the sections of the teeth 2 of the stator 1 are sectorial. The windings 4 of the stator are embedded in the slots 3, respectively, and the structures thereof are square-wave open rings. Each layer of windings 4 is formed by a single conducting wire. The number of the slots 3 and the teeth 2 is a multiple of 3. The number of the teeth is a multiple of 3 times as much as the number of the magnet poles of the rotor 5. On the rotor 5 there are laid chips of magnet poles 6 with a space 7 between each two adjacent chips. Slits 8 are formed both in each chip of the magnet pole 6 and the magnet yoke on the rotor 5. The rotor 5 is a hollow member 9. The shaft 10 of the rotor 5 is driven by a driving machine. When the driving machine drives the rotor to rotate, the generator starts to generate electricity to supply power to a load. FIG. 2 is a developed view of the stator windings of the present invention. The stator windings are made up of square-wave open rings. A set of windings consists of three branch windings A1, A2 and A3, which corresponding to a pair of opposite magnet poles are arranged to embed in their respective slots on the stator with different pitches as: crossing 5 teeth then crossing 1 tooth; crossing 3 teeth then crossing 3 teeth; and crossing 1 tooth then crossing 5 teeth. Each 12 slots on the stator form a minimum unit. The windings between the units can be connected in series, parallel or series-parallel mode as requirement. A plurality sets of windings can be overlapped and embedded in a same slot. The windings can be connected in series, parallel or series-parallel. The three-phase windings are arranged in slots on the stator with their respective displacements to obtain three-phase output from the three phase generator. The magnet poles on the rotor are arranged in order of N-S-N-S. FIG. 3 shows the rotor structure, in which the magnet poles 6 laid on the rotor and the magnet yoke of the rotor have slits 8 formed extending axially along the rotor in order to cut off the current eddy circuits to increase the reluctance and to decrease iron loss and thereby to reduce the heating. The slits 8 are used for cutting off all the major circulation of current eddy, and the length thereof is longer than a half of the axial length of the magnet poles. But it can not be too long, otherwise it will reduce the mechanical strength of the rotor. The width of the slits 8 is 0.1 mm, which is the optimum value obtained by tests. The distance between each two adjacent poles 6 on the rotor equals to the width of the slots on the stator. And the thickness of the magnet poles is 7–8 times as much as the width of the air gap between the rotor and stator, which is also a optimum value determined by tests. If the poles are too thick it will consume more magnetic material; if they are too thin the output power of the generator will decrease. The two ends of each of the magnet poles 6 are formed into wedge shape and are fixed on the rotor surface with adhesive. The wedge shaped portion are tightly held by wrap edges of the rotor. The portion covered by the wrap edges is not more than a quarter of the pole thickness.

The structural features and effects of the present invention will be described in conjunction with the accompanying drawings as follows.

FIG. 2 is a developed view of the stator of the present invention. In FIG. 2, the three branch windings denoted by solid line A1, A2 and A3 with different pitches form the phase A winding of the generator. Similarly, the branch windings B1, B2 and B3 denoted by long-dashed line and the branch windings C1, C2 and C3 denoted by short-dashed line with different pitches form the other two phase windings B and C, respectively.

The number 12,20,30 . . . 3×10n are the serial number of the stator teeth(slots). The A, B and C phase windings of the three-phase generator are denoted by A, B and C respectively. The winding of each phase is made up of three square-wave coils with different pitches which, corresponding to a pair of opposite magnet poles, are arranged to embed in their respective slots on the stator with different pitches as: crossing 5 teeth then crossing 1 tooth; crossing 3 teeth then crossing 3 teeth; and crossing 1 tooth then crossing 5 teeth, i.e., Phase A(solid line): A1→A1', A2→A2' and A3→A3'
Phase B(long-dashed line): B1→B1', B2→B2' and B3→B3'
Phase C(short-dashed line): C1→C1', C2→C2' and C3→C3'

These windings are sequentially embedded in their respective slots as follows: for phase A, A1→A1' starts at the first slot, A2→A2' starts at the second slot and A3→A3' starts at the third slot; the windings for phase B start at the next slot with their negative phase, i.e., B1'→B1 starts at the second slot, B2'→B2 starts at the third slot and B3'→B3 starts at the fourth slot; and similarly, the windings for phase C start at the next slot relative to the B windings with their positive phase, i.e., C1→C1' starts at the third slot, C2→C2' starts at the fourth slot, C3→C3' starts at the fifth slot. In this way, 120 degree's phase difference between every two three-phase windings can be obtained.

The winding of each phase comprises three branches (wires) connected in series as follows:

for phase A winding: (A1→A1')→(A2→A2')→(A3→A3')
for phase B winding: (B1→B1')→(B2→B2')→(B3→B3')
for phase C winding: (C1→C1')→(C2→C2')→(C3→C3')

Thus, the output voltage for each phase equals to the sum of the potentials induced at the three coils of the winding thereof. If the potential induced at each coil of the windings is denoted by $\Delta E$, the output phase voltage E for the three phases respectively are:

Phase A:$E_A = \Delta E_{A1-A1'} + \Delta E_{A2-A2'} + \Delta E_{A3-A3'}$
Phase B:$E_B = \Delta E_{B1-B1'} + \Delta E_{B2-B2'} + \Delta E_{B3-B3'}$
Phase C:$E_C = \Delta E_{C1-C1'} + \Delta E_{C2-C2'} + \Delta E_{C3-C3'}$ The working process of the three-phase generator of the present invention will now be described in conjunction with FIG. 2.

Provided the pole N of the rotor of the generator passes through the position right under the first, second and third tooth(slot) at the time $T_A$, at this time, since the magnetic flux of pole N are cut by A1→A1', A1→A2' and A3→A3' simultaneously, the voltage for phase A winding reaches its maximum value $E_A = E_{Amax} = \Delta E_{A1-A1'} + \Delta E_{A2-A2'} + \Delta E_{A3-A3'}$ The rotor continues to rotate, and when the pole N reaches the position right under the second, third and fourth tooth (slot) at time TB the magnetic flux of the pole N are cut by windings(wires) B1→B1', B2→B2' and B3→B3' simultaneously, the voltage for phase B windings reaches its maximum value $E_B = E_{Bmax} = \Delta E_{B1-B1'} + \Delta E_{B2-B2'} + \Delta E_{B3-B3'}$ Similarly, when the pole N reaches the position right under the third, fourth and fifth tooth(slot), the magnetic flux of the pole N are cut by phase C winding(wires)C1→C1', C2→C2' and C3→C3' simultaneously, the voltage for phase C winding reaches its maximum value $E_C = E_{Cmax} = \Delta E_{C1-C1'} + \Delta E_{C2-C2'} + \Delta E_{C3-C3'}$ During the rotating of the rotor, the pole N moves relative to the windings on the stators thereby the three phase voltages $E_A, E_B$ and $E_C$ are varied continuously. When the pole S reaches the position right under the first, second and third tooth (slot), a maximum value of voltage in the opposite direction, that is the minimum voltage, appears at the phase A winding:

$E_A = E_{Amin} = \Delta E_{A1-A1'} + \Delta E_{A2-A2'} + \Delta E_{A3-A3'}$
$E_B = E_{Bmin} = \Delta E_{B1-B1'} + \Delta E_{B2-B2'} + \Delta E_{B3-B3'}$
$E_C = E_{Cmin} = \Delta E_{C1-C1'} + \Delta E_{C2-C2'} + \Delta E_{C3-C3'}$ In this way, alternating voltages with a phase difference of 120 degrees can be obtained at the outputs of phases A, B and C.

Compared with the conventional generator of the same output power, the generator of the present invention has much less weight and smaller size, and its special windings significantly reduce the consuming of copper wire. Further, since its internal resistance is very low, its external characteristic is excellent. The output voltage is almost unchanged even when the load changing, therefore having a good overload capacity.

What is claimed is:

1. An electric generator including:

a stator defining a plurality of rectangularly shaped winding slots separated from each other by sectorially shaped stator teeth;

stator windings embedded in each of said winding slots and defining winding branches;

rotor coaxially mounted for rotation within said stator about a rotor axis and spaced-apart from said stator by an air gap;

a magnet yoke disposed on a circumference of said rotor and including a plurality of spaced-apart magnets thereon, each of said magnets having magnet poles;

wherein axially extending slits are defined at least partially through said circumference of said rotor into said magnet yoke and at least partially through an axial length of said magnets thereon;

wherein for said stator windings corresponding to a pair of opposite of said magnetic poles, three of said branch windings belong to one phase of said generator and comprise square-wave open rings with different pitches, said pitches selected from a group consisting of (a) crossing five said teeth then crossing one of said teeth, (b) crossing three of said teeth and then crossing three of said teeth, and (c) crossing one of said teeth and then crossing five of said teeth.

2. The electric generator of claim 1, wherein said winding slots number S, said stator teeth number T, and said magnetic poles number P, and S and T are each a multiple of three, and T is a multiple of three times P.

3. The electric generator of claim 1, wherein a distance separating adjacent ones of said magnetic poles equals a width of a said slot.

4. The electric generator of claim 3, wherein said magnetic poles have a thickness exceeding a width of said air gap by seven to eight.

5. The electric generator of claim 4, wherein said magnet poles each have two end portions that are formed into a wedge shape and are affixed to said circumference of said rotor with adhesive;

wherein said portions are tightly retained by wrap edges of said rotor such that said portions have a thickness less than a quarter-thickness of said magnet poles.

6. The electric generator of claim 1, wherein a length of said slits exceeds half of an axial length of said magnet poles.

7. The electric generator of claim 6, wherein a width of said slits is 0.1 mm.

8. The electric generator of claim 1, wherein a minimum unit is defined by twelve of said winding slots with said stator windings embedded therein, and said windings between said units are connectable in a configuration selected from the group consisting of (a) series, (b) parallel, and (c) series-parallel.

9. The electric generator of claim 8, wherein a plurality of sets of said windings are overlapped in multiple layers and embedded in said slots at a same position, said windings being connectable in a configuration selected from the group consisting of (a) series, (b) parallel, and (c) series-parallel.

10. The electric generator of claim 8, wherein there are three phase windings embedded in respective ones of said slots with respective displacements.

11. The electric generator of claim 8, wherein each layer of a winding in one of said strator slots comprises a single conducting wire.

12. The electric generator of claim 3, wherein a length of said slits exceeds half of an axial length of said magnet poles.

13. The electric generator of claim 4, wherein a length of said slits exceeds half of an axial length of said magnet poles.

14. The electric generator of claim 5, wherein a length of said slits exceeds half of an axial length of said magnet poles.

15. The electric generator of claim 9 wherein there are three phase windings embedded in respective ones of said slots with respective displacements.

* * * * *